US006179077B1

(12) United States Patent
Burdges et al.

(10) Patent No.: US 6,179,077 B1
(45) Date of Patent: Jan. 30, 2001

(54) VEHICLE HEAT EXCHANGER SYSTEM AND METHOD FOR A VEHICLE THAT AUGMENTS AND MODIFIES AERODYNAMIC FORCES

(75) Inventors: Kenneth P. Burdges, Atlanta; Robert J. Englar, Marietta, both of GA (US)

(73) Assignee: Georgia Tech Research Corporation, Atlanta, GA (US)

(*) Notice: Under 35 U.S.C. 154(b), the term of this patent shall be extended for 0 days.

(21) Appl. No.: 09/215,947

(22) Filed: Dec. 18, 1998

Related U.S. Application Data

(60) Provisional application No. 60/068,105, filed on Dec. 19, 1997.

(51) Int. Cl.$^7$ .................................................. B60K 11/04
(52) U.S. Cl. .............................................................. 180/68.4
(58) Field of Search .................................. 180/68.1, 68.4, 180/68.6; 165/98, 99

(56) References Cited

U.S. PATENT DOCUMENTS

| | | | |
|---|---|---|---|
| 1,310,870 | * | 7/1919 | Mapson ................................ 180/68.6 |
| 2,503,411 | * | 4/1950 | Prouse ................................. 180/68.4 |
| 3,835,948 | * | 9/1974 | Dulco .................................. 180/68.4 |
| 4,116,265 | * | 9/1978 | Staebler ................................ 165/98 |
| 4,147,207 | * | 4/1979 | Lesyk ................................... 165/98 |
| 4,753,288 | * | 6/1988 | Harvey ................................. 165/98 |
| 4,995,447 | * | 2/1991 | Weidmann et al. ............ 180/68.1 X |
| 5,588,482 | * | 12/1996 | Holka ............................. 180/68.1 X |

FOREIGN PATENT DOCUMENTS

| | | | | |
|---|---|---|---|---|
| 174244 | * | 3/1935 | (CH) . | |
| 587555 | * | 11/1933 | (DE) . | |
| 2937005 | * | 4/1980 | (DE) | ................................. 180/68.4 |
| 501963 | * | 3/1936 | (GB) . | |
| 2268451 | * | 1/1994 | (GB) . | |
| 5241 | * | 1/1991 | (JP) . | |
| 404129831 | * | 4/1992 | (JP) . | |

* cited by examiner

*Primary Examiner*—Brian L. Johnson
*Assistant Examiner*—Bryan Fischmann
(74) *Attorney, Agent, or Firm*—Thomas, Kayden, Horstemeyer & Risley, L.L.P.

(57) ABSTRACT

A high density heat exchanging system is provided for a vehicle. The system essentially comprises an aerodynamic member, a porous device (including a radiator core), and a force augmentation device. The aerodynamic member is arranged and configured on the vehicle to produce forces and loads on the vehicle generally desirable for improving traction and handling. The porous device with radiator core, including an inlet and an outlet, is embedded in the aerodynamic member. The inlet of the porous device and radiator core is disposed on a high pressure surface of the aerodynamic member and the outlet is disposed on a low pressure surface of the aerodynamic member, thereby allowing fluid to flow through the porous device and the radiator core. The force augmentation device is disposed on the aerodynamic member. A fluid flow passes from the high pressure surface of the aerodynamic member to the low pressure surface of the aerodynamic member through the porous device, passing the radiator core, thereby providing heat exchange.

40 Claims, 3 Drawing Sheets

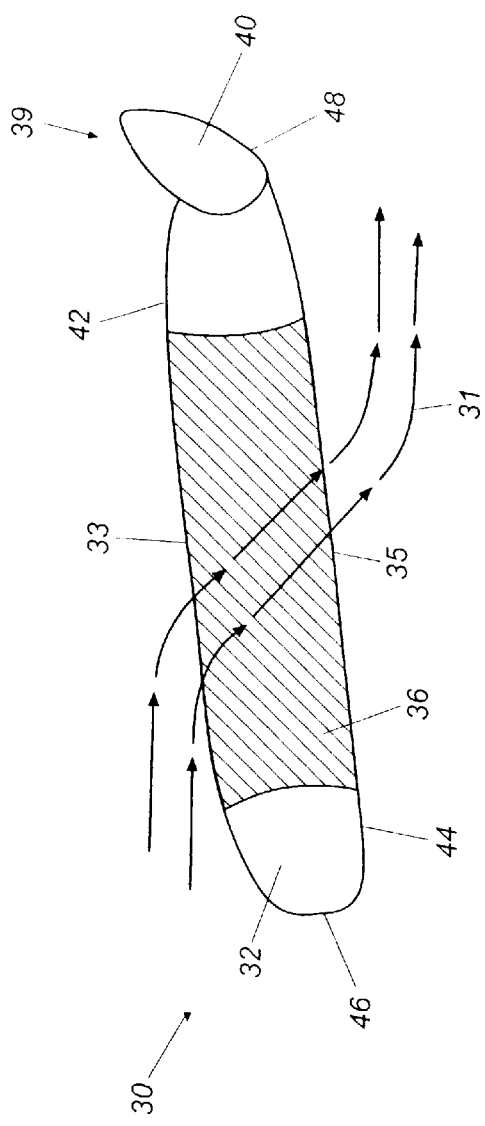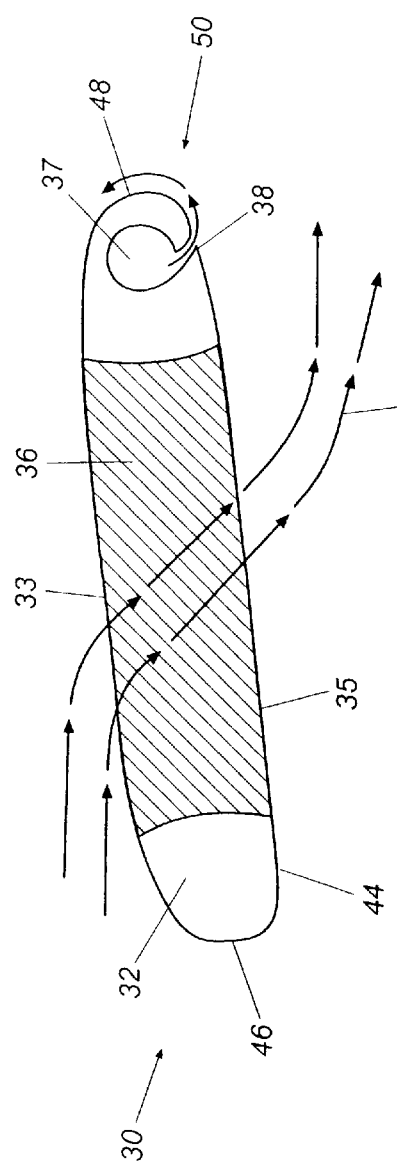

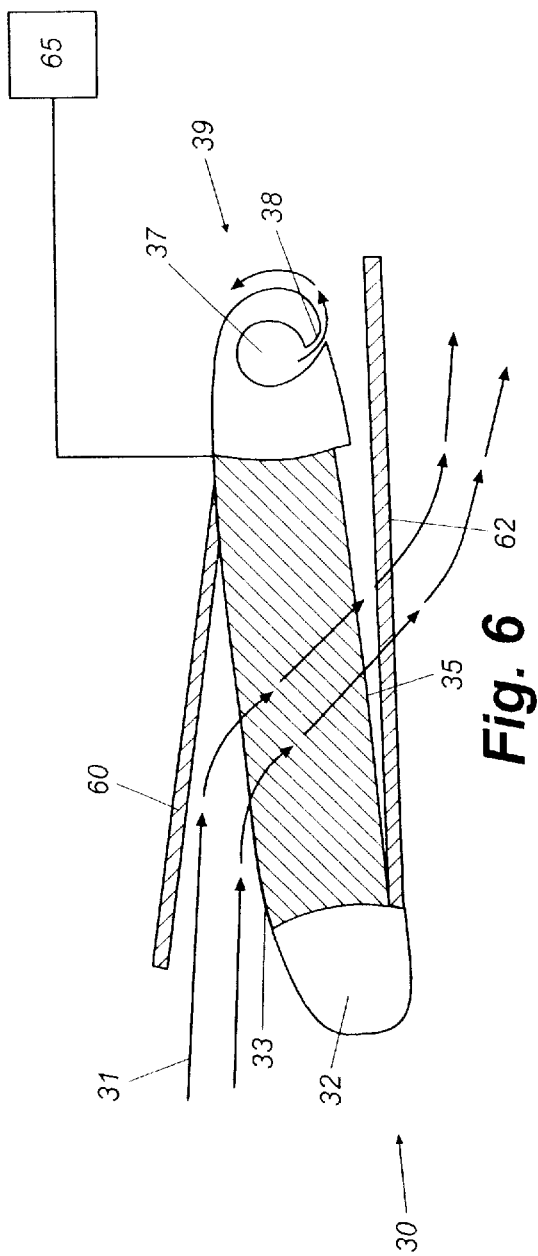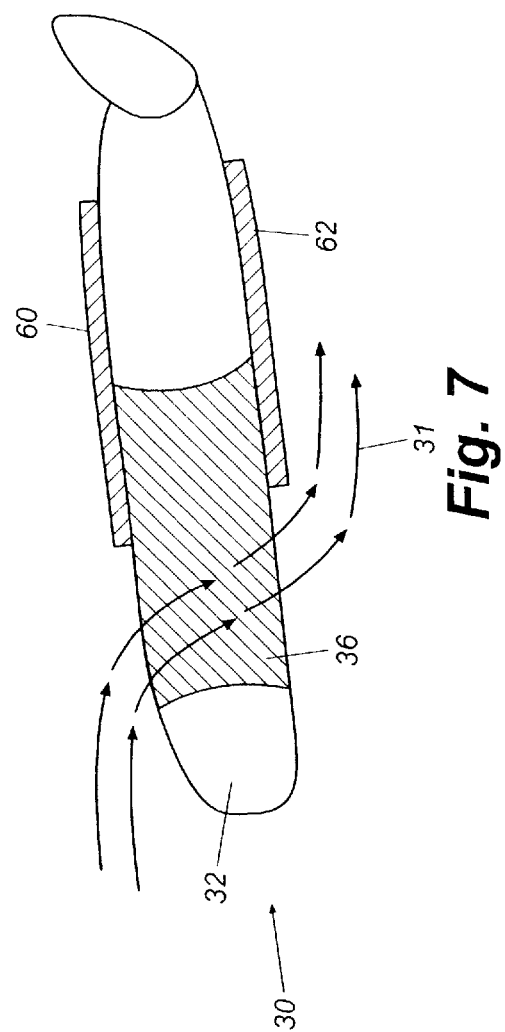

VEHICLE HEAT EXCHANGER SYSTEM AND METHOD FOR A VEHICLE THAT AUGMENTS AND MODIFIES AERODYNAMIC FORCES

CROSS-REFERENCE TO RELATED APPLICATIONS

The application claims priority to U.S. Provisional Patent Application Serial No. 60/068,105 filed on Dec. 19, 1997.

TECHNICAL FIELD

The present invention relates generally to heat exchangers for vehicles that affect the aerodynamics of a vehicle. More specifically, the present invention relates to a system and method for providing a heat exchanger on a vehicle, where the heat exchanger augments and modifies aerodynamic forces.

BACKGROUND OF THE INVENTION

Currently, heat exchangers on vehicles are typically placed substantially perpendicular to an air flow and towards the front of the vehicle, which requires a large frontal area on the vehicle, thereby producing a high associated drag. FIG. 1 illustrates a traditional heat exchanger device on a typical commercial vehicle. Private and commercial vehicles usually employ a heat exchanger commonly referred to as a "radiator" to effect heat transfer. As illustrated, the radiator is traditionally placed substantially perpendicular to the free stream flow encountered by the vehicle as the vehicle travels forward. As a result, the vehicle experiences a substantial drag force. While the perpendicularly arranged radiator cools the vehicle engine effectively, the associated drag greatly affects the performance of the vehicle. The result is a decrease in fuel efficiency.

FIG. 2 depicts a typical Formula 1 or "Indy" racing car. On this type of vehicle, a heat exchange device, or radiator, is also traditionally placed substantially perpendicular to a free stream flow of air encountered by the vehicle when the vehicle travels in a forward direction. However, the heat exchanger is usually built into a side pod, rather than mounted on the front end as with the commercial vehicle. In this configuration, air is ducted from the free stream into the pod such that it passes through the heat exchanger and out through an exhaust port. Similar to the commercial vehicle of FIG. 1, there is a large amount of drag created by the heat exchange device. Furthermore, in neither the commercial application nor the racing application does the heat exchanger perform well at low vehicle speed, unless a mechanical device, such as a fan, is used to promote flow through the radiator. Fans, however, absorb and reduce engine power.

Thus, a heretofore unaddressed need exists in the industry to address the aforementioned deficiencies and inadequacies.

SUMMARY OF THE INVENTION

The present invention provides a system and method for supplying high density heat exchange to a vehicle at various speeds, including zero to low speeds. In structure, the high density heat exchanging system essentially comprises an aerodynamic member, a porous device, and a force augmentation device. The aerodynamic member is configured to generate aerodynamic forces when a free stream flow is encountered, and includes a high pressure surface, a low pressure surface, a leading edge and a trailing edge, where the leading edge and the trailing edge define a length therebetween. The aerodynamic member is arranged and configured on the vehicle to produce forces and loads on the vehicle generally desirable for improving traction and handling of the vehicle. The porous device is disposed intermediate within the length of the aerodynamic member and provides heat exchange when fluid flows through the porous device. The porous device includes an inlet, configured to receive fluid flow and disposed in the high pressure surface of the aerodynamic member, and an outlet, configured to expel fluid flow and disposed in the low pressure surface of the aerodynamic member. In this configuration, the fluid flow passes from flowing adjacent the high pressure surface of the aerodynamic member to flowing adjacent the low pressure surface of the aerodynamic member through the porous device. The force augmentation device is disposed on the aerodynamic member. The force augmentation device can augment forces generated by the aerodynamic member or be configured to generate force independently, thereby encouraging fluid flow through the porous device when a free stream of flow is absent.

The present invention can also be viewed as a method for producing high density heat exchange in a vehicle. The method can be broadly summarized by the following steps: providing an aerodynamic member on a vehicle and generating an aerodynamic force on that vehicle with the aerodynamic member. The method further comprises the steps of providing heat exchange with a porous device disposed within the aerodynamic member and augmenting the aerodynamic force with a device disposed on the aerodynamic member.

An advantage of the present invention is a system that provides an increased pressure differential across a porous device and radiator core for efficient heat transfer.

Another advantage of the present invention is a system that provides effective heat transfer for a vehicle, even at zero to low speed, while reducing the frontal area of the vehicle and aerodynamic drag upon the vehicle.

An additional advantage of the present invention is to provide a heat exchange device for racing cars that improves aerodynamic down force and reduces aerodynamic drag while providing high cooling rates without the use of moving parts, such as fans.

Another advantage of the present invention is that it provides a system of non-moving parts comprising a synergistic radiator/aerodynamic control surface in a single structure contributing to improved mechanical reliability of the system and reduced weight of the vehicle.

An additional advantage of the present invention is improved traction in turns for race cars, or in icy/snowy/rainy weather for commercial vehicles.

Another advantage is reduction of frontal area and radiator drag.

Yet another advantage of the present invention is an improvement in fuel economy for commercial vehicles due to the reduction in frontal area and radiator drag.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are

FIG. 4 illustrates a side view of a first preferred embodiment of the present invention illustrated in FIG. 3.

FIG. 5 illustrates a side view of a second preferred embodiment of the present invention illustrated in FIG. 3.

FIG. 6 illustrates a side view of a third preferred embodiment of the present invention, illustrated in FIG. 3, where the sleeves are hingedly fixed.

FIG. 7 illustrates a side view of a third preferred embodiment of the present invention, illustrated in FIG. 3, where the sleeves are slideably mounted.

DETAILED DESCRIPTION OF THE INVENTION

Figure 1:
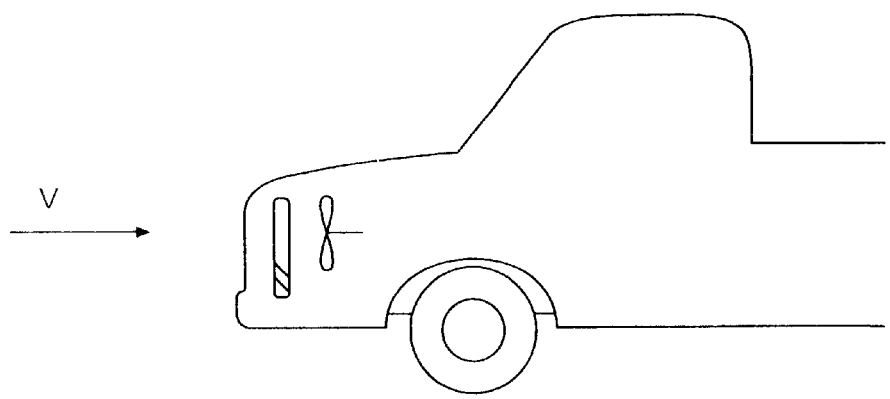
FIG. 1 illustrates a side view of a conventional vehicle radiator on a commercial vehicle.
Figure 2:
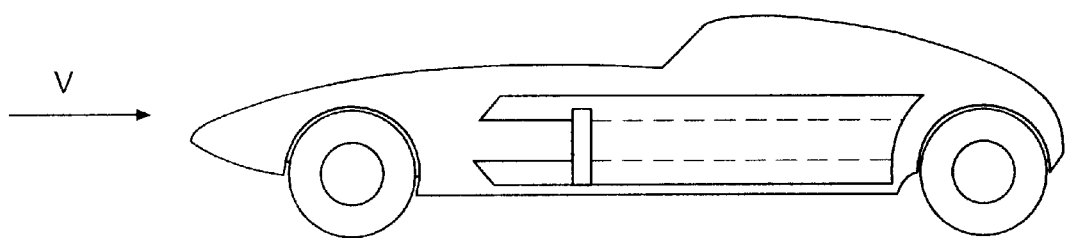
FIG. 2 illustrates a side view of a conventional vehicle radiator on a Formula 1 or "Indy" racing car.

While the invention is susceptible to various modification and alternative forms, a specific embodiment thereof is shown by way of example in the drawings and will herein be described in detail. It should be understood, however, that there is no intent to limit the invention to the particular form disclosed, but on the contrary, the invention is to cover all modification, equivalents, and alternatives falling within the spirit and scope of the invention as defined by the claims.

Figure 3:
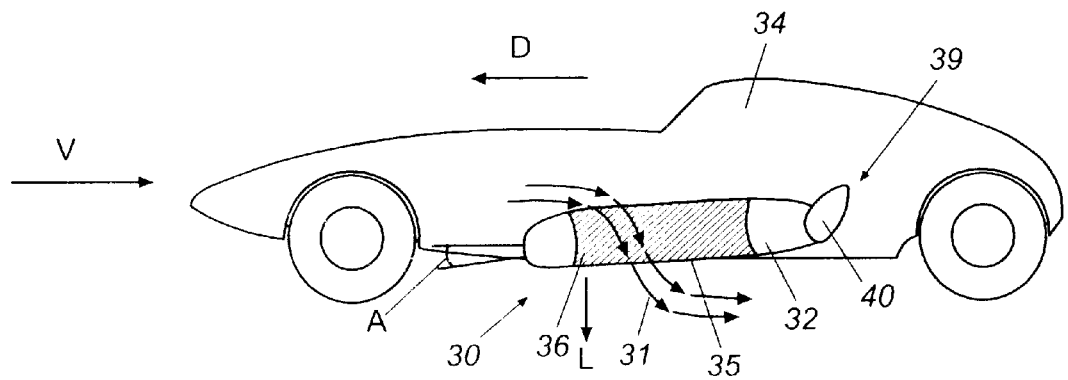
FIG. 3 illustrates a side view of a first preferred embodiment of the present invention as provided on a vehicle.

FIGS. 3 and 4 illustrate a first preferred embodiment of the high density heat exchanging system 30. While the system 30 is illustrated in FIG. 3 as applied to a racing car, it should be understood that the system 30 is not limited to racing applications or even to automobile applications, and could be applicable to virtually any mobile vehicle or thing. Furthermore, while the fluid flow is referred to herein primarily as air, it should be understood that the fluid flow is not limited to that of air. In the first preferred embodiment, the high density heat exchanging system 30 is mounted on, as for example, a vehicle 34, as shown in FIG. 3. The system 30, preferably, provides heat exchange for a vehicle 34 engine whereby fluid coolant circulated adjacent heated engine parts is circulated through the radiator core for cooling.

In structure, the system 30 includes an aerodynamic member 32 with a porous device 36 disposed therein and, optionally, but preferably, a force augmentation device 39 disposed thereon. The porous device 36 can be further defined to include a radiator for providing heat exchange. The aerodynamic member 32 includes a high pressure surface 42, a low pressure surface 44, a leading edge 46, and a trailing edge 48. The porous device 36 is disposed within the aerodynamic member 32 between the leading edge 46 and the trailing edge 48 and includes an inlet 33, preferably disposed on the high pressure surface 42 of the aerodynamic member 32, and an outlet 35, disposed on the low pressure surface 44 of the aerodynamic member 32. A force augmentation device 39 is included on the aerodynamic member 32 in which the porous device 36 is embedded. In the first preferred embodiment the force augmentation device 39 comprises a mechanical flap 40 hingedly disposed on the aerodynamic member 32 towards the trailing edge 48 and is capable of various deflection positions. The deflection position of the mechanical flap 40 in relation to the aerodynamic member 32 can be altered, thereby ultimately altering the forces produced on the vehicle 34 by the system 30. A force augmentation device may also comprise a pneumatic control device.

Looking now at a method of use for the high density heat exchanging system 30, the aerodynamic member 32 can be provided on the front or rear of the vehicle; however, it is preferable that the aerodynamic member 32 is provided on a side of the vehicle 34 such as to generate a desired aerodynamic force on the vehicle. The force generally desired is a downward lift force L (shown in FIG. 3) to improve traction of the vehicle 34 when the vehicle encounters a free stream of flow V (shown in FIG. 3). However, it should be understood that the aerodynamic member 32 can be provided such as to produce other desired forces. As such, it is preferred that the aerodynamic member 32 is disposed on the vehicle 34 such that the high pressure surface 42 of the aerodynamic member 32 is facing upwardly and the low pressure surface 44 of the aerodynamic member 32 is facing downwardly. The aerodynamic member 32 is provided to a side of the vehicle and aligned substantially parallel to the prevailing wind, or free stream of flow encountered by the vehicle when the vehicle moves forwardly. Alternatively, the aerodynamic member 32 is disposed at a negative angle A (shown in FIG. 3) to the predominant direction of motion D (shown in FIG. 3) of the vehicle 34, thereby allowing the aerodynamic member 32 to entrain a maximum amount of total pressure. The mechanical flap 40 of the first preferred embodiment acts to augment the aerodynamic forces by producing lift, or down force, as a result of the deflection position. The force generated by the force augmentation device 39 creates an increased pressure differential across the porous device 36, thereby increasing the flow of fluid adjacent the radiator core and providing effective heat exchange. The entrained fluid flows adjacent the aerodynamic member 32 and through the porous device 36, as illustrated by the arrows numbered 31, in FIG. 3, thereby providing heat exchange. Additionally, the lift, drag, and aerodynamic moments acting on the vehicle are varied by the aerodynamic member 32 and mechanical flap 40. As such, the present invention provides increased download and traction for the vehicle 34, as well as heat exchange.

In the case of racing cars, the side pod thickness and drag, of the conventional configurations, will be decreased by the new shape of the member fixed to the vehicle and because the radiator is no longer substantially perpendicular to the airflow. In the case of commercial vehicles, the frontal area will be reduced, thereby reducing drag. Additionally, the present invention operates on pressure differentials to provide heat exchange and therefore does not require a fan or other mechanical device to operate effectively, thereby cutting down on moving parts, reducing vehicle weight, and increasing mechanical reliability of the vehicle.

FIG. 5 illustrates a second preferred embodiment of the high density heat exchanging system 30. The second preferred embodiment includes an aerodynamic member 32 and a porous device 36, as disclosed above, and a force augmentation device 39 comprising a pneumatic circulation control device 50 disposed towards the trailing edge 48 of the aerodynamic surface 32. The circulation control device 50 ejects air from a pressurized source 37, embedded in the aerodynamic member 32, and out a slot 38 disposed in the low pressure surface 44 and towards the trailing edge 48 of the aerodynamic member 32. It is preferred that the trailing edge 48 is substantially rounded in cross-section in the second preferred embodiment. The air is ejected from the slot 38 substantially tangentially to the adjacent portion of the low pressure surface 44 such that fluid flow is entrained about the rounded trailing edge 48 of the aerodynamic member 32. Pneumatic circulation control devices are known in the art and an example is disclosed in U.S. Patent Application Serial No. 08/503,185; inventor, Robert J. Englar; filed Jul. 17, the disclosure of which is herein incorporated by reference. The application of the pneumatic circulation control device 50 to the present invention allows mass flow through the heat exchanger in the absence of a free stream of flow, such as when the vehicle is nearly to completely stationary.

FIG. 6 illustrates a third preferred embodiment of the high density heat exchanging system 30. The third preferred embodiment also includes an aerodynamic member 32 and a porous device 36, as disclosed above. The third preferred embodiment may also, optionally, include either of the force augmentation devices 39 disclosed in the first two embodiments, another heretofore undisclosed force augmentation device 39, or no force augmentation device at all. The third preferred embodiment further includes an appropriately placed forward-facing inlet sleeve 60. The inlet sleeve 60 is preferably adjustable and attached to the high pressure surface 42 of the aerodynamic member 32. The inlet sleeve 60 captures additional pressure from the free stream fluid flow and channels additional flow into the inlet 33 of the porous device 36, thereby channeling additional flow through the porous device 36. It is preferable that the aerodynamic member 32 also includes an outlet sleeve 62, although it should be understood that the system 30 may include only one of the inlet sleeve 60 or the outlet sleeve 62. It is preferable that the outlet sleeve 62 is aft-facing, and disposed on the low pressure surface 44 of the aerodynamic member 32 and adjacent the outlet 35 of the porous device 36. The outlet sleeve 62 acts to counteract lift loss due to the porosity of the porous device 36 and also increase the entrainment capability of a force augmentation device 39 along the trailing edge 48 of the aerodynamic member 32. FIG. 6 illustrates the inlet sleeve 60 and the outlet sleeve 62 hingedly fixed the aerodynamic member 32. FIG. 7 illustrates the inlet sleeve 60 and the outlet sleeve 62 slidably fixed to the aerodynamic member 32.

It is further preferable that, as disposed on an aerodynamic member 32, the inlet sleeve 60 and the outlet sleeve 62 act as controllers receiving information input 65 to alter the position of the sleeves 60 and 62, to yield the desired amount of aerodynamic lift, down load, drag and moments, as well as the desired level of heat transfer across the porous device 36. The inlet sleeve 60 and the outlet sleeve 62 also allow compliance to the prevailing racing car regulations, which prohibit holes or porosity in these particular portions of the vehicle, and require the lower surface parallel to the road. Additionally, the use of the inlet sleeve 60 and the outlet sleeve 62 will prevent water or other spray from impacting the nearly-horizontal apparatus 30.

Many variations and modifications may be made to the above-described embodiment(s) of the invention without departing substantially from the spirit and principles of the invention. All such modifications and variations are intended to be included herein within the scope of the present invention.

What is claimed is:

1. A high density heat exchanging system for a vehicle comprising:

an aerodynamic force-generating member mounted to the vehicle, said aerodynamic force-generating member having a high pressure surface and a low pressure surface, and a leading edge and a trailing edge, said leading edge and said trailing edge defining a length therebetween. wherein said force-generating member is capable of generating an intended aerodynamic force on the vehicle; and a porous device, said porous device disposed intermediate said length of said aerodynamic force-generating member, said porous device having an inlet arranged and configured to receive fluid flow, and said porous device having an outlet arranged and configured to expel fluid flow;

wherein said aerodynamic force-generating member and said porous device are arranged such that a fluid flow passes through said aerodynamic force-generating member from said high pressure surface of said aerodynamic force-generating member to said low pressure surface of said aerodynamic force-generating member through said porous device.

2. The high density heat exchanging system of claim 1, further comprising:

a force augmentation device, said force augmentation device disposed on said aerodynamic force-generating member.

3. The high density heat exchanging system of claim 1, wherein said inlet of said porous device is disposed in said high pressure surface of said aerodynamic force-generating member.

4. The high density heat exchanging system of claim 1, wherein said outlet of said porous device is disposed in said low pressure surface of said aerodynamic force-generating member, said low pressure being less than an ambient pressure, and a pressure differential through said porous device being higher than a free stream dynamic pressure.

5. The high density heat exchanging system of claim 1, wherein said aerodynamic force-generating member is mounted on a side of the vehicle.

6. The high density heat exchanging system of claim 1, wherein said aerodynamic force-generating member is fixed to the vehicle substantially parallel to a predominant direction of movement of the vehicle.

7. The high density heat exchanging system of claim 1, wherein said aerodynamic force-generating member is fixed to the vehicle at a negative angle to a predominant direction of movement of the vehicle.

8. The high density heat exchanging system of claim 1, wherein said porous device is further defined as a radiator core.

9. The high density heat exchanging system of claim 2, wherein said force augmentation device is further defined as a flap mechanism fixed towards said trailing edge of said aerodynamic force-generating member.

10. The high density heat exchanging system of claim 2, wherein said force augmentation device is further defined as a pneumatic circulation control device disposed towards said trailing edge of said aerodynamic force-generating member.

11. The high density heat exchanging system of claim 1, further comprising:

an inlet sleeve, said inlet sleeve disposed adjacent said high pressure surface of said aerodynamic force-generating member, a portion of said inlet sleeve being disposed a predetermined distance from said inlet of said porous device, thereby altering fluid flow through said porous device.

12. The high density heat exchanging system of claim 11, wherein said inlet sleeve is adjustable.

13. The high density heat exchanging system of claim 11, wherein said inlet sleeve is hingedly mounted to said high pressure surface of said aerodynamic force-generating member.

14. The high density heat exchanging system of claim 11, wherein said inlet sleeve is slidably mounted to said high pressure surface of said aerodynamic force-generating member.

15. The high density heat exchanging system of claim 11, wherein said inlet sleeve is further defined as a controller, said controller configured to alter fluid flow on said high pressure surface of said aerodynamic force-generating member, thereby altering forces produced by said aerodynamic force-generating member and altering fluid flow through said porous device.

16. The high density heat exchanging system of claim 1, further comprising:
an outlet sleeve, said outlet sleeve disposed adjacent said low pressure surface of said aerodynamic force-generating member, a portion of said outlet sleeve being disposed a predetermined distance from said outlet of said porous device, thereby altering fluid flow through said porous device.

17. The high density heat exchanging system of claim 16, wherein said outlet sleeve is adjustable.

18. The high density heat exchanging system of claim 16, wherein said outlet sleeve is hingedly mounted to said low pressure surface of said aerodynamic force-generating member.

19. The high density heat exchanging system of claim 16, wherein said outlet sleeve is slidably mounted to said low pressure surface of said aerodynamic force-generating member.

20. The high density heat exchanging system of claim 16, wherein said outlet sleeve is further defined as a controller, said controller configured to alter fluid flow across said low pressure surface of said aerodynamic force-generating member, thereby altering forces produced by said aerodynamic force-generating member and altering fluid flow through said porous device.

21. A high density heat exchanging system for a vehicle comprising:
a means for generating an intended aerodynamic force on the vehicle; said generating means attached to an outer surface of the vehicle
a means for exchanging heat, said heat exchanging means disposed in said means for generating an aerodynamic force on the vehicle, said heat exchanging means having an inlet and an outlet, wherein a fluid flows through said heat exchanging means resulting in heat exchange.

22. A high density heat exchanging system of claim 21, further comprising:
a means for augmenting force, said means for augmenting force disposed on said means for generating an intended aerodynamic force on the vehicle.

23. The high density heat exchanging system for a vehicle of claim 21, wherein said means for generating an aerodynamic force on the vehicle is mounted on a side of the vehicle.

24. The high density heat exchanging system for a vehicle of claim 21, further comprising:
an inlet altering means, said inlet altering means disposed on said means for generating an aerodynamic force on the vehicle and adjacent said inlet of said heat exchanging means.

25. The high density heat exchanging system for a vehicle of claim 21, further comprising:
an outlet altering means, said outlet altering means disposed on said means for generating an aerodynamic force on the vehicle and adjacent said outlet of said heat exchanging means.

26. A method for producing high density heat exchange in a vehicle comprising the steps of:
providing an aerodynamic force-generating member attached to an outer surface of the vehicle, said aerodynamic force-generating member having a surface, a leading edge, and a trailing edge, wherein said force-generating member is capable of generating an intended force on the vehicle;
generating an aerodynamic force on the vehicle with said aerodynamic force-generating member; and
providing heat exchange within said aerodynamic force-generating member.

27. The method of claim 26, further comprising the step of:
augmenting said aerodynamic force on the vehicle with a force augmentation device.

28. The method of claim 26, further comprising the step of:
providing said aerodynamic force-generating member on the vehicle substantially parallel to a predominant direction of movement of the vehicle.

29. The method of claim 26, further comprising the step of:
providing said aerodynamic force-generating member on the vehicle at a negative angle to a predominant direction of movement of the vehicle.

30. The method of claim 27, wherein said step of augmenting said aerodynamic force on the vehicle further comprises the steps of:
providing a movable mechanical flap towards a trailing edge of said aerodynamic force-generating member; and
adjusting said mechanical flap such that said flap produces large aerodynamic forces on the vehicle by producing a high suction on a low pressure surface of said aerodynamic force-generating member, said low pressure being less than an ambient pressure.

31. The method of claim 27, wherein said step of augmenting said aerodynamic force on the vehicle further comprises the steps of:
providing a pneumatic circulation control device towards said trailing edge of said aerodynamic force-generating member, said pneumatic circulation control device augmenting said aerodynamic force by producing a high suction on a low pressure surface of said aerodynamic force-generating member, said low pressure surface having a pressure less than an ambient pressure.

32. The method of claim 26, further comprising the step of mounting a sleeve on said surface of said aerodynamic force-generating member.

33. The method of claim 32, wherein said sleeve is mounted adjustably.

34. The method of claim 32, wherein said sleeve is mounted hingedly.

35. The method of claim 32, wherein said sleeve is mounted slidably.

36. A high density heat exchanging system for a vehicle comprising:
a vehicle;
a aerodynamic force-generating member mounted to said vehicle, said aerodynamic force-generating member having a high pressure surface and a low pressure surface, and a leading edge and a trailing edge, said leading edge and said trailing edge defining a length therebetween, wherein said aerodynamic force-generating member is capable of generating an intended force on said vehicle; and a porous device, said porous device disposed intermediate said length of said aerodynamic force-generating member, said porous device having an inlet arranged and configured to receive fluid flow, and said porous device having an outlet arranged and configured to expel fluid flow;

wherein said aerodynamic force-generating member and said porous device are arranged such that a fluid flow passes from said high pressure surface of said aerodynamic force-generating member to said low pressure surface of said force-generating member through said porous device, thereby producing an effective heat exchange.

37. The high density heat exchanging system of claim 36, further comprising:

a force augmentation device, said force augmentation device disposed on said aerodynamic force-generating member.

38. The high density heat exchanging system of claim 37, wherein said force augmentation device is further defined as a flap mechanism fixed towards said trailing edge of said aerodynamic force-generating member.

39. The high density heat exchanging system of claim 37, wherein said force augmentation device is further defined as a pneumatic circulation control device disposed towards said trailing edge of said aerodynamic force-generating member.

40. A heat exchanging system for a vehicle, said system comprising:

an aerodynamic member attached to the vehicle, said aerodynamic member defined by an upper surface and a lower surface, said upper and lower surfaces having openings therein;

a heat exchanger embedded in said aerodynamic member; and an airflow over said aerodynamic member, said airflow creating a high pressure on one of said aerodynamic member surfaces and a low pressure on the other of said aerodynamic member surfaces, wherein a large difference in pressure between said aerodynamic member surfaces causes a fluid flow into the opening in one of said aerodynamic member surfaces, through said heat exchanger and out of the opening in the other of said aerodynamic member surfaces.

* * * * *